United States Patent [19]
Brandstadter

[11] Patent Number: 5,097,916
[45] Date of Patent: * Mar. 24, 1992

[54] ACTIVE HYDROPNEUMATIC SUSPENSION SYSTEM

[75] Inventor: Jack M. Brandstadter, Royal Oak, Mich.

[73] Assignee: Cadillac Gage Textron Inc., Warren, Mich.

[*] Notice: The portion of the term of this patent subsequent to Feb. 6, 2007 has been disclaimed.

[21] Appl. No.: 449,556

[22] Filed: Dec. 12, 1989

Related U.S. Application Data

[63] Continuation of Ser. No. 251,676, Sep. 30, 1988, Pat. No. 4,898,257.

[51] Int. Cl.$^5$ .................. B60G 17/04; B60G 17/08; B62D 55/112
[52] U.S. Cl. ............................... 180/9.1; 180/9.52; 180/22; 180/41; 188/305; 267/218; 280/6.12; 280/705; 280/707; 280/DIG. 1
[58] Field of Search .................. 180/9.1, 9.52, 22, 41; 280/6.12, 705, 707, 708, DIG. 1; 188/305; 267/218

[56] References Cited

U.S. PATENT DOCUMENTS

| | | | |
|---|---|---|---|
| 3,038,739 | 6/1962 | Vogel | 280/707 |
| 3,124,368 | 3/1964 | Corley et al. | 280/707 |
| 3,606,365 | 9/1971 | Strong | 280/707 |
| 3,770,292 | 11/1973 | Palazzetti | 280/708 |
| 4,212,484 | 7/1980 | Fujii | 280/707 |
| 4,215,403 | 7/1980 | Pollard et al. | 280/707 |
| 4,420,167 | 12/1983 | Winblad | 280/707 |
| 4,579,366 | 4/1986 | Doi et al. | 280/707 |
| 4,787,649 | 11/1988 | Watanabe et al. | 280/707 |
| 4,787,650 | 11/1988 | Doi et al. | 280/707 |
| 4,830,397 | 5/1989 | Watanabe et al. | 280/707 |
| 4,848,790 | 7/1989 | Fukunaga et al. | 280/707 |
| 4,898,257 | 2/1990 | Brandstadter | 280/707 |

FOREIGN PATENT DOCUMENTS

| | | | |
|---|---|---|---|
| 78806 | 4/1988 | Japan | 280/707 |
| 2155207 | 9/1985 | United Kingdom | 280/707 |

*Primary Examiner*—Mitchell J. Hill
*Attorney, Agent, or Firm*—John C. Evans

[57] ABSTRACT

An active suspension system for use with a mass suspended relative to a movable structure and subject to external forces such as the chassis of off-road vehicles, and in particular the hull of heavy combat vehicles, has a passive hydropneumatic suspension system (PHSS) connected to a servopump and an accumulator, and wherein the servopump transfers fluid energy between the accumulator and the suspension system, in accordance with sensed operating conditions which are inputted to a processor whose output commands the velocity of the servopump to control the pressure and volume relationships of the PHSS and accumulator to improve the ride of said vehicle and to substantially reduce energy requirements when operating off-road.

19 Claims, 5 Drawing Sheets

ACTIVE HYDROPNEUMATIC SUSPENSION SYSTEM

This is a continuation of application Ser. No. 251,676, filed on Sept. 30, 1988 and issued on Feb. 6, 1990 as U.S. Pat. No. 4,898,257.

FIELD OF THE INVENTION

This invention relates to suspension systems for masses suspended relative to movable structures and subjected to external forces including chassis of wheeled or tracked vehicles, and more particularly, to active hydropneumatic suspension systems for controlling the ride and energy consumption of off-road vehicles, generally, and in particular for heavy combat vehicles.

BACKGROUND OF THE INVENTION

Combat vehicles are at the present time equipped with passive suspension systems. Passive suspension systems consist of either mechanical or hydropneumatic springs in combination with fluid or friction dampers. The design of such systems is a compromise between the conflicting requirements for a stiff, heavily damped, suspension system to statically equilibrate and to dynamically stabilize the vehicle and a soft, lightly damped, suspension system which readily compresses and expands to isolate the vehicle hull from terrain disturbances. This compromise, results in a combat vehicle wherein the crew's ride, the weapon platforms' stability, the loss of contact with the ground, and the dampers' energy absorption, combine to limit the mobility, agility, and combat effectiveness of the weapon system as it travels cross-country. In addition, such compromise systems causes high forces to be transmitted between the ground and the vehicle so as to reduce the life of track, wheels, and bearings. Resultant shock and vibration may increase the maintenance requirements for associated sights, sensors, and electronics mounted interiorly of the vehicle's hull.

Numerous concepts for semi-active and active suspension systems whose object is to improve the ride and the stability of road and rail vehicles have been disclosed in United States Patents.

The semi-active suspension systems sense various operating conditions and control the damping force in accordance with the sensed conditions. U.S. Pat. No. 4,579,366, for example, describes a suspension apparatus of this type for use on road vehicles. In the '366 patent, the damping force of a hydropneumatic suspension is optimally controlled by controlling the opening of throttle valves disposed between hydropneumatic chambers and hydraulic actuators in accordance with the calculated road state on which a vehicle is riding. The suspension system of the '366 patent is not suited for harsh off-road operating conditions such as produced by large amplitude terrain disturbances encountered by combat vehicles. Such disturbances develop correspondingly large spring forces that cannot be compensated by optimization of damping forces alone.

The active suspension systems sense various operating conditions and control both the damping and the spring forces in accordance with the sensed conditions. The resultant performance of such systems requires input of considerable energy to drive pump components therein. U.S. Pat. No. 4,639,013 describes an active suspension apparatus of this type which attempts to reduce input energy requirements while improving ride. In the '013 patent, a single acting hydraulic actuator and an associated variable, offset, hydropneumatic chamber control the static component of the force acting on the vehicle and a parallel, double acting, hydraulic actuator and an associated servovalve and damping valve control the dynamic component of the force acting on the vehicle.

In a road vehicle, the dynamic component is primarily due to the acceleration, braking, and cornering inertial forces acting on the vehicle. These forces are smaller than the static force, and the aforedescribed parallel arrangement results in a substantial reduction in the energy required to stabilize the vehicle in reaction to these forces.

In an off-road vehicle, however, the dynamic component is primarily due to terrain disturbances producing large road wheel motions. The forces associated with these large motions are greater than the static force and the parallel arrangement results in an increase in the energy required to isolate the vehicle in reaction to these motions. Thus, the increased size, weight, and cost of the parallel arrangement is not offset by a comparable reduction in the energy requirements under off-road conditions and, therefore, this type of system is not applicable to off-road vehicles generally and to combat vehicles specifically.

U.S. Pat. No. 3,625,303 describes a proactive ride control system for combat vehicles. It requires a visual sensor to measure the terrain profile in front of the vehicle. The sensor inputs a computer which in turn regulates an active suspension to control the spring and damping forces. The sensor is used to anticipate the terrain in an attempt to increase the period of time to raise and lower wheels to reduce shock loading in the vehicle. Increased time also enables the input energy to the active system to be spread over time so as to reduce the power requirements and the size, weight, and cost of the suspension system components. In order to perform its intended purpose, the sensors must be reliable under rough operating conditions and must accurately determine terrain conditions. In practice neither objective is met. The present invention reduces energy requirements without use of such visual sensors.

U.S. Pat. No. 3,606,365 discloses an active suspension system for a wheeled vehicle such as a passenger train. The system has a piston connected to the car and a cylinder connected to the wheel (the connections can be reversed) for providing a leveling device between the car and the wheel. Fluid is directed into or is exhausted from the cylinder to change the relative distance between the wheel and the car in accordance with its acceleration or movement. The system has solenoid controlled valves which are opened and closed to selectively control the amount of fluid which is displaced relative to the piston to control the car wheel distance. The pressure fluid which is used to displace the piston is supplied from a reservoir connected to a pump. The pump raises the energy level of the fluid from atmosphere, the pressure fluid is held in the reservoir until a solenoid valve opens and then is directed into the cylinder to raise the car, e.g., to compensation for downward acceleration on opposition acceleration (upward car movement), the pressure fluid is directed through a dump valve to atmosphere to provide opposite compensation tending to lower the car back to level. Consequently, leveling fluid must continually be raised from a low energy state to a high energy state which is ten exhausted thereby to reduce the energy efficiency of the system. While such use of energy may be acceptable in certain wheeled vehicles such as passenger trains, it is unacceptable in systems in which fuel economy is critical such as in the case of combat vehicles whose battle field effectiveness depends in many cases on the range of the vehicle attributable to the on-board fuel capacity of the vehicle. In such cases an energy efficient suspension system can increase the vehicle's operating range by using a lesser amount of fuel for vehicle suspension control and a greater amount of on-board fuel to increase the operational range of the vehicle.

SUMMARY OF THE INVENTION

Accordingly, a feature of the present invention is to reduce energy required to operate a system for controlling the force acting between a sprung mass and an unsprung mass and thereby the motion of the sprung mass and to so by use of a passive hydropneumatic suspension system mechanically connected between the sprung and unsprung mass and fluidly connected in series to a servopump and hydropneumatic accumulator. The servopump controlled in accordance with the condition of the masses to transfer a volume of pressurized fluid between the passive hydropneumatic suspension system and the hydropneumatic accumulator to actively control the force without excessive dissipation of energy.

Another feature of the present invention is to provide an active hydropneumatic suspension system for off-road vehicles, wherein a sprung mass is supported relative to a movable unsprung mass and wherein the system's energy requirements are reduced, and in particular, wherein the sprung mass is the hull of a heavy combat vehicles, supported by such an active hydropneumatic system whose energy requirement is substantially less than the energy absorbed by the dampers of known passive suspension systems.

Another feature of the present invention is to reduce mobility, agility, and fuel restraints imposed by suspensions used on present day off-road vehicles by the provision of an active hydropneumatic suspension system to control the spring and the damping forces acting on an off-road vehicle so as to maintain the height and the attitude of the vehicle relative to the terrain at low frequencies and to maintain the height and the attitude of the vehicle relative to inertial references at higher frequencies, such frequencies to be a function of the velocity of the vehicle.

It is a further object of the present invention to provide an active hydropneumatic suspension system of the type set forth in any of the preceding objects wherein means are provided to control the nominal height and attitude of the sprung mass.

It is another feature of the present invention to provide an active hydropneumatic suspension system including means to automatically equilibrate the flow control system in response to changing steady state ambient and operating conditions to further reduce energy requirements to operate the suspension system.

It is another feature of the present invention to provide an active hydropneumatic suspension system which saves energy, increases vehicle speed and reduces crew fatigue during operation of the active system while reverting to a compromise passive self-contained hydropneumatic suspension system when the active system is turned off or fails, and which momentarily reverts to the passive mode of operation whenever the motion of the roadwheels relative to the vehicle in the jounce direction develop actuator forces in excess of the active control systems' capability to oppose such forces thereby to enable the vehicle to better traverse terrain disturbances which the vehicle might not otherwise clear under control of the active system.

It is a further object of the present invention to provide an active hydropneumatic suspension system whose fluid system is external to the vehicle and whose electrical system is internal to the vehicle to improve vehicle survivability.

It is another object of the present invention to provide an active hydropneumatic suspension system wherein the parasitic loss is minimized.

According to the present invention an active hydropneumatic system for an off-road vehicle comprises in combination a passive hydropneumatic suspension containing a volume of pressure fluid, said pressure fluid acting on the area of the piston of a hydraulic actuator to develop a vertical force to support the vehicle relative to a roadwheel. A servopump and a hydropneumatic accumulator are connected in series with the passive suspension, the accumulator containing a volume of pressure fluid, the pressure fluid serving to statically equilibrate the servopump, and the servopump serving to dynamically transfer fluid energy between the passive suspension system and the accumulator at a rate and in a direction proportional to the velocity of the servopump so as to effect the vertical force on the suspension.

An electrical system controls the velocity of the servopump in response to sensed operating conditions to actively control the vertical force. The passive suspension, the servopump the accumulator, and the control system are the basic components of the present invention. They may be combined with other devices to form numerous embodiments of the invention, each of which embodiments is designed to best meet the requirements of a specific application.

In a first such embodiment each corner of a heavy off-road vehicle is supported relative to a plurality of roadwheels. Each roadwheel is mounted for rotation on the trailing end of a roadarm. The other end of the road arm is mounted for oscillation on a roadarm spindle secured to the vehicle hull. A connecting rod interconnects the road arm with a piston which is supported for vertical motion in a manifold also secured to the vehicle hull.

The piston and the manifold enclose a volume of pressure fluid. The pressure fluid applies a vertical force to the vehicle which is reacted through the roadwheel to ground. A fluid passage in the manifold interconnects the volume of pressure fluid associated with each of said roadwheels and connects them to a series arrangement of a first hydropneumatic accumulator, a fluid damper, a mode selection value, a servopump, and a second hydropneumatic accumulator.

The first accumulator, the damper, and the interconnected volumes of pressure fluid form a passive hydropneumatic suspension system wherein the pressure gas in the accumulator acts as a spring to support the sprung mass of that corner of the vehicle, the damper absorbs fluid energy and converts it to heat energy as a function of the fluid flow rate through the damper, and the volumes of pressure fluid apply the resultant spring and damping forces to the vehicle. The mode selection value is normally closed, and thus, when either the driver chooses, an active mode failure is sensed, or the engine is turned off, the valve blocks the flow of pressure fluid between the passive suspension system and the flow control system.

The flow control system includes the servopump and the second accumulator. The servopump comprises a direct current servomotor whose output shaft through a shaft seal drives an external gear pump. When the mode selection valve is energized, it permits an unrestricted flow of pressure fluid between the passive suspension system and the active control system wherein, the pressure gas in the second accumulator equilibrates the servopump and the servopump transfers fluid energy (in the form of a volume of pressure fluid) between the suspension system and the accumulator at a rate and in a direction proportional to the velocity and direction of rotation of the servopump to adjust the position of the sprung mass (vehicle hull) with respect to the unsprung mass (roadwheels) as the terrain changes.

The mode selection valve includes means for momentarily reverting to the passive mode when a control system overload is sensed in the jounce direction of motion of the roadwheels.

An equilibration valve senses pressure difference across the servopump and at a low flow rate transfers fluid energy between the second accumulator and a hydraulic power supply to reduce such pressure difference so as to equilibrate the servopump despite changed steady state operating and ambient conditions.

An electrical control system commands the velocity of the servopump to produce changes in the vertical force acting on the vehicle hull. It comprises an electrical power supply, a servoamplifier, the servomotor, an inner control loop, and a plurality of outer control loops. In combination, they control the vertical force acting on the vehicle and thereby the motion of the vehicle in response to the mean vertical motion of the group of roadwheels relative to inertial references, the mean vertical position of the group of roadwheels relative to the vehicle, and the vertical motion of that corner of the vehicle relative to an inertial reference to improve the equilibration at low frequencies and the isolation and stabilization at higher frequencies. Equilibration is an increase in the capacity of a suspension system to maintain a static or dynamic state of balance in the system between opposing forces or motions thereon. Isolation is a reduction in the capacity of such system to respond to an excitation. Stabilization is an increase in the capacity of a system to restore the initial system condition when it is disturbed from a condition of equilibrium.

The active hydropneumatic suspension systems in each of the four corners of the vehicle act in conjunction to maintain the height and the attitude of the vehicle relative to the terrain at low frequencies and relative to inertial references at higher frequencies. The frequencies are controlled as a function of the vehicle velocity.

Off-road terrain is random and a vehicle traversing such terrain at a typical cross country speed encounters a broad range of amplitudes and frequencies of terrain input. The interflow between the interconnected actuators, in response to these inputs, reduces the amplitude and the frequency of the fluid flow rate to the suspension system in the passive mode of operation and to the flow control system in the active mode of operation. This effect is greater when traversing high frequency terrain disturbances than when traversing low frequency terrain disturbances. The smoothing of the terrain relative to the suspension system thereby reduces the frequency response and the energy requirements of the suspension system.

This embodiment has only one passive suspension system and one control system per corner of the vehicle, and benefits from the interflow between actuators to produce an advantageous active suspension system wherein the size, weight, cost, and energy requirements are minimized. However, when this embodiment is applied to a combat vehicle, the vehicles survivability when damaged in battle and the difficulty of replacing such a large assembly in the field are disadvantages.

A second embodiment of the invention is more survivable. The second embodiment is an arrangement that requires fewer devices in combination with the basic components of the present invention as compared to the first embodiment. The second embodiment with its lesser number of parts is duplicated at each roadwheel station. Such redundancy increases the vehicles survivability when damaged in battle and simplifies the replacement in the field of damaged units.

Each roadwheel is mounted for rotation on the trailing end of a roadarm. The other end of the roadarm is mounted for oscillation on a roadarm spindle secured to the vehicle hull. A connecting rod interconnects the roadarm with a piston which is supported for vertical motion in a manifold (or cylinder) also secured to the vehicle hull. The piston and the manifold enclose a volume of pressure fluid. The pressure fluid applies a vertical force to the vehicle which is reacted through the roadwheel to ground. A fluid conduit in the manifold interconnects the volume of pressure fluid with a series arrangement of a first hydropneumatic accumulator, a servopump and a second hydropneumatic accumulator. The first accumulator and the enclosed volume of pressure fluid form a passive hydropneumatic suspension system wherein the pressure gas in the first accumulator acts as a spring to support the sprung mass of the vehicle. The pressure gas in the second accumulator equilibrates the servopump and the servopump transfers fluid energy between the suspension system and the second accumulator at a rate and in a direction proportional to the velocity of the servopump.

An equilibration valve senses pressure difference across the servopump and at a low flow rate transfers fluid energy between the second accumulator and a hydraulic power supply to reduce the pressure difference and to equilibrate the servopump despite changed steady state operating and ambient conditions.

An electrical system controls the velocity of the servopump. It comprises an electrical power supply, a servoamplifier, a servomotor, an inner control loop and a plurality of outer control loops. In combination, they control the vertical force acting on the vehicle and thereby the motion of the vehicle in response to the vertical motion of the vehicle relative to the roadwheel, the vertical motion of the roadwheel relative to first inertial reference, and the vertical motion of the vehicle relative to a second inertial reference to improve the equilibration at low frequencies and the isolation and stabilization at higher frequencies. The active hydropneumatic suspension system for each roadwheel acting in conjunction with the other roadwheel suspension systems maintain the height and attitude of the vehicle relative to the terrain at low frequencies and relative to the inertial references at higher frequencies. The frequencies are controlled as a function of the vehicle velocity.

When the driver chooses, a control system failure is sensed or the engine is turned off, the suspension system reverts to a passive mode of operation wherein the servopump free wheels, the first accumulator and the second accumulator act in parallel to provide a relatively soft spring to support the sprung weight of the vehicle and the pump leakage and viscous drag in combination with the seal and the bearing friction provide low but adequate damping to enable the vehicle to complete its mission even though its suspension performance is somewhat reduced.

With reference to the first embodiment, the terrain disturbances encountered by an off-road vehicle result in large roadwheel motions and correspondingly large displacements of pressure fluid as the pistons are reciprocated within the manifold as the roadwheels move. It is the primary task of the active suspension system to isolate the vehicle at higher frequencies from these large roadwheel motions. A major portion of the displaced pressure fluid is transferred between the passive suspension system and the second accumulator by the servopump. The energy of this volume of pressure fluid is first stored in the second accumulator and then restored to the suspension system as required.

The energy requirement of the servopump is a function of the pressure differential across the pump and not a function of the absolute pressure of the fluid being transferred. The pressure differential is small compared to the absolute pressure, and the energy requirements of this arrangement are therefore also small when compared to prior arrangements wherein the absolute pressure is dissipated in a control valve, relieved to a low pressure reservoir, repressurized to the high pressure level by an engine driven pump, and restored through the control valve to the passive suspension system. Additionally, the parasitic loss associated with the servopump and the electrical power supply is substantially less than the parasitic loss associated with the control valve and the hydraulic power supply.

A minor portion of the displaced pressure fluid is transferred through the damper to the spring. This operation is in stark contrast to know passive suspensions for off-road vehicles whose operation requires a major portion of the displaced pressure fluid to be transferred through the fluid damper with a commensurate large absorption and dissipation of energy. The ratio of the volume of pressure fluid transferred through the damper to the spring in the active mode of operation compared to the volume of pressure fluid transferred through the damper to the spring in the passive mode of operation is a measure of both the reduction in the dynamic component of the vertical force acting on the vehicle and of the energy absorbed by the fluid damper. The sum of that energy required to operate the servopump and that energy absorbed by the fluid damper in the active mode of operation is substantially less than that energy absorbed by the fluid damper in the passive mode of operation. Thus, the present invention when, operating off-road, is not only considerably more energy efficient than other active suspension systems, but is substantially more energy efficient than the passive suspension systems it would replace.

The present invention therefore provides a suspension system for an off-road vehicle wherein the ride for the crew and the equipment is improved, the fuel consumption is reduced because less energy is utilized in the active mode of operation. Also, wear and tear on other vehicle systems is reduced because of a reduction in forces transmitted between the ground and the vehicle thereby providing the capability for increased mobility and agility in a cost effective manner.

DESCRIPTION OF THE INVENTION

These and other objects of the present invention will be more apparent with reference to the following description and drawings of a preferred embodiment of the invention wherein.

Figure 1:
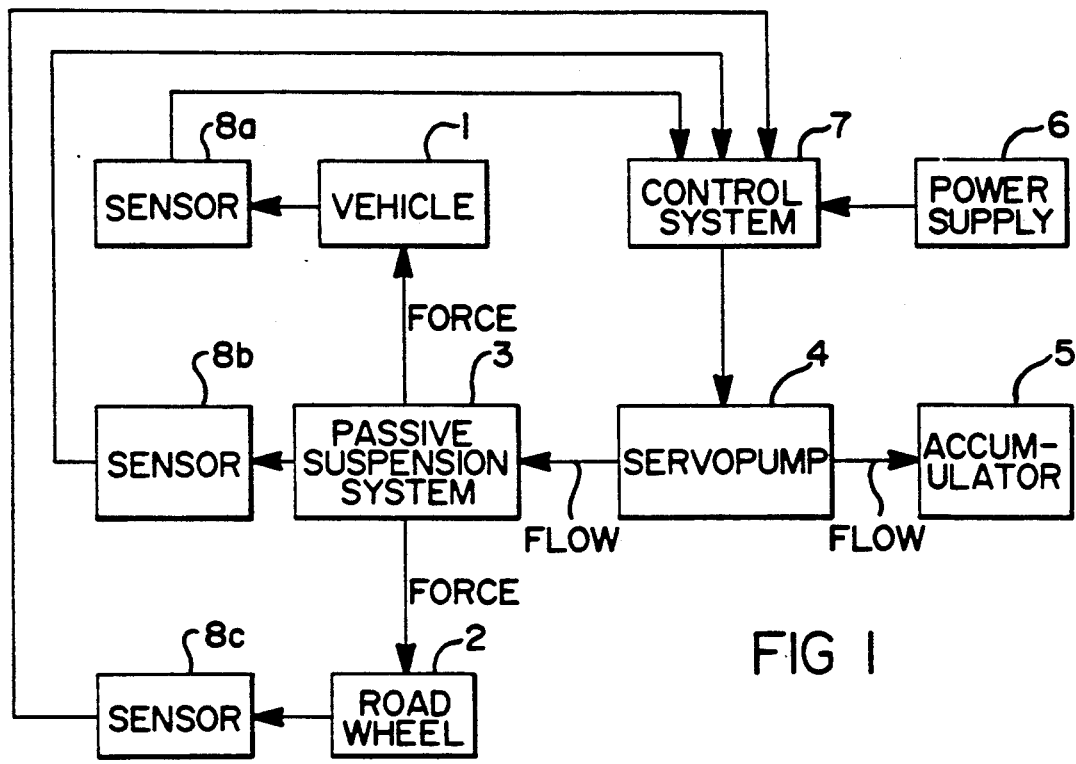
FIG. 1 is a block diagram of the present invention illustrating the basic concept.

Referring now to FIG. 1, a vehicle 1 is supported relative to a roadwheel 2 by a passive hydropneumatic suspension system 3. A servopump 4 and a hydropneumatic accumulator 5 are connected in series by fluid conduits to passive suspension system 3. Accumulator 5 statically equilibrates servopump 4 and servopump 4 dynamically transfers fluid energy between a first volume of fluid pressure in suspension system 3 and a second volume of pressure fluid in accumulator 5 at a rate and in a direction proportional to the velocity of the servopump. A power supply 6 provides the energy required for the operation of control system 7. Control system 7 controls the velocity of servopump 4 in reaction to sensed motion 8a of the vehicle relative to an inertial reference; sensed motion 8b of the motion of the vehicle relative to the roadwheel; and sensed motion 8c of the roadwheel relative to an inertial reference to actively control the rate of change of the position of vehicle 1 (the sprung mass) relative to roadwheel 2 (the unsprung mass) at low frequencies and to actively control the rate of change of force acting on vehicle 1 and reacted through roadwheel 2 to ground at higher frequencies.

It should be understood that the use of a servopump to transfer volumes of pressure fluid between a series connected suspension system and a pressure accumulator, within the scope of the present invention, is applicable to any suspension which requires one or more of equilibration, isolation, and stabilization and in particular isolation, e.g., off-shore oil drilling platforms, railway cars, boats with compartments to be isolated against external marine disturbances.

Figure 2:
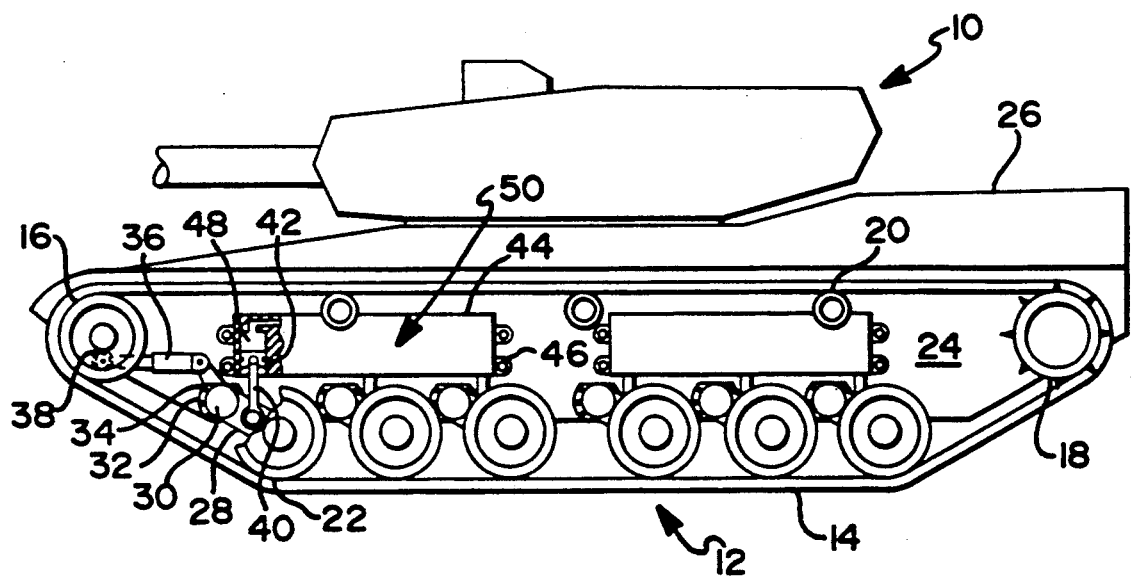
FIG. 2 is a side elevation view of a tracked vehicle with a suspension system including the present invention.

Referring now to FIG. 2, an armored vehicle 10 is illustrated. It includes two track laying systems 12, only one of which is shown. The system 12 includes a track 14 guided over an idler wheel 16 and a drive sprocket 18. A plurality of support rollers 20 guide the upper reach of the track. The vehicle is suspended by a plurality of roadwheels 22, spaced axially along the side wall 24 of the vehicle hull 26. Each roadwheel 22 is mounted for rotation on one end of a trailing roadarm 28. The other end of roadarm 28 is mounted for oscillation on a roadarm spindle 30. A flange 32 which is an integral part of roadarm spindle 30 and a plurality of flange bolts 34 fixedly secures roadarm spindle 30 to vehicle hull 26. An adjustable track tensioner 36 is coupled between an idler arm 38 and a roadarm 28 of the forwardmost roadwheel.

One end of a connecting rod 40 is connected for oscillation and misalignment to roadarm 28 the other end of connecting rod 40 is connected for limited oscillation and misalignment to a piston 42. Piston 42 is supported for vertical motion in manifold 44. Manifold 44 is fixedly secured to vehicle hull 26 by mounting bolts 46. Piston 42 and manifold 44 form a pressure fluid chamber 48. The pistons 42 and pressure fluid chambers 48a–48c define a hydraulic actuator. Fluid passages in manifold 44 connect those pressure fluid chambers which apply vertical forces to one corner of vehicle 10 and interconnect them with the other electrohydraulic, hydraulic, and hydropneumatic components of active hydropneumatic suspension system 50 hereinafter AHSS 50.

The systems 12 are representative of track laying systems improved by the present invention which is equally suitable for use on other track systems or on wheeled vehicles.

Figure 3:
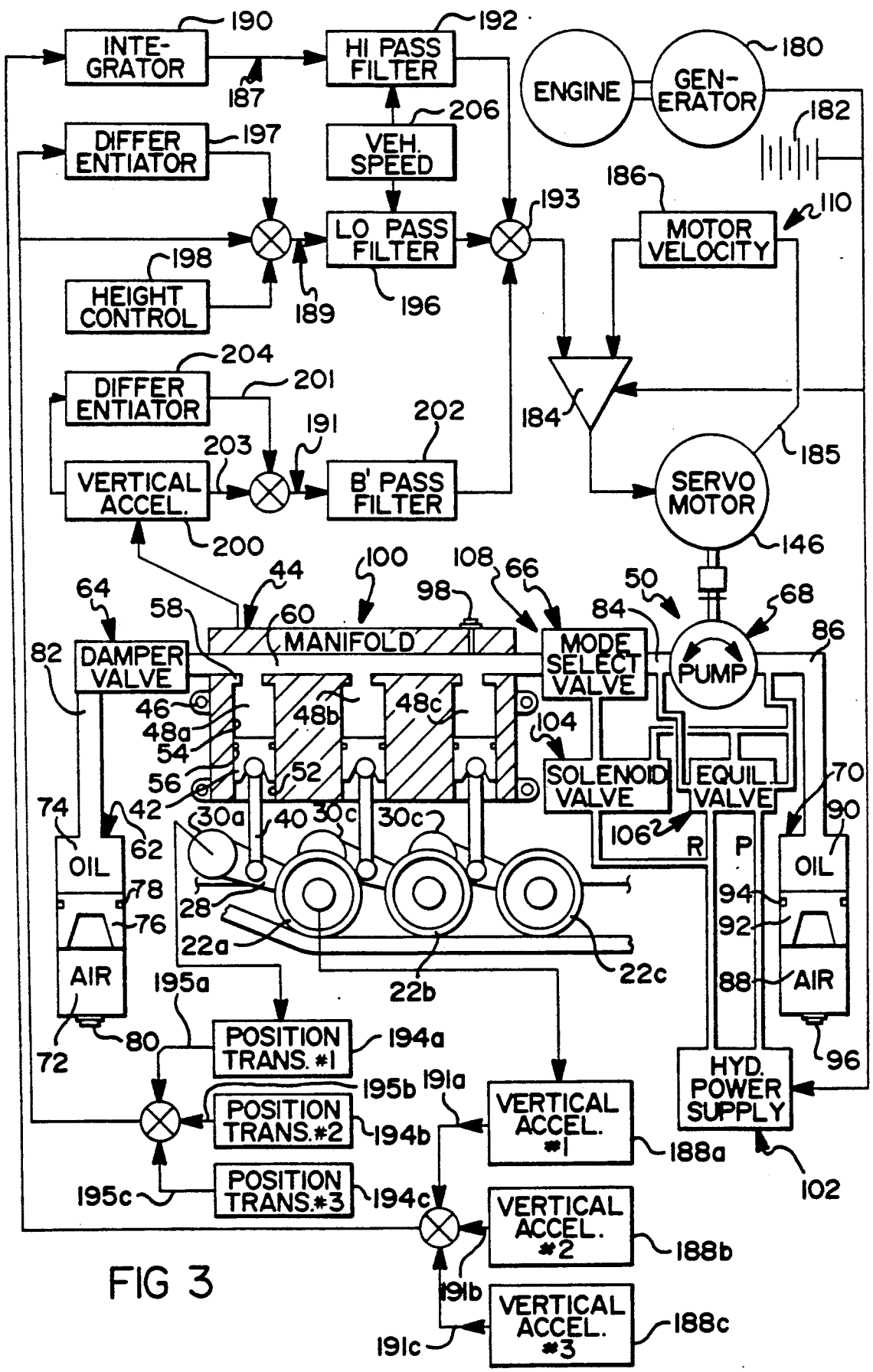
FIG. 3 is a schematic view of one embodiment of the present invention supporting a corner of the vehicle relative to a plurality of roadwheels.

Manifold 44 of AHSS 50, as shown in FIG. 3, contains at each of the plurality of roadwheels 22 a, b, c that support one corner of vehicle 10, a cylinder bore 52. Piston 42 is supported by the wall 54 of cylinder bore 52 for vertical motion. A piston seal 56 retained in piston 42, piston 42, and a cylinder head 58 which is an integral portion of manifold 44 form a chamber 48 which encloses a volume of pressure fluid. Fluid passage 60 interconnects chambers 48 a, b, c and a common pressure applies a vertical force to vehicle 10. Fluid passage 60 also connects chamber 48 a, b, c to a series arrangement of hydraulic and hydropneumatic devices. This series arrangement comprises a first hydropneumatic accumulator 62, a fluid damper 64, a mode selection valve 66, a servopump 68, and a second hydropneumatic accumulator 70.

Hydropneumatic accumulator 62 has a gas chamber 72 and a fluid chamber 74 separated by a floating piston 76 which retains a seal 78. A charge fitting 80 directs gas into chamber 72 to produce an initial charge pressure.

A fluid passage 82 connects fluid chamber 74 to fluid damper 64. Fluid damper 64 comprises, as is well known to those skilled in the art, a flow restriction, an asymmetrical arrangement of relief valves to limit the pressure differential, and a flow compensator to reduce the pressure differential at high jounce flow rates.

Fluid passage 60 connects fluid damper 64 to mode selection valve 66. Mode selection valve 66 is a pilot-operated, normally closed two-way valve. When energized, valve 66 permits flow between fluid passage 60 and a fluid passage 84. Fluid passage 84 connects mode selection valve 66 to one side of servopump 68. A fluid passage 86 connects the other side of servopump 68 to second hydropneumatic accumulator 70.

Accumulator 70 has a gas chamber 88 and a fluid chamber 90 separated by a floating piston 92 which retains a seal 94. A charge fitting 96 directs gas into chamber 88 to produce an initial charge pressure.

A charge fitting 98 in manifold 44 directs pressure fluid into fluid passage 60 to compress the gas in chamber 72 and in chamber 88 to increase the pressures therein to the static pressure required to support the weight of that corner of the vehicle at the desired height.

Mode selection valve 66 is normally closed, and hydropneumatic accumulator 62, fluid passage 82, fluid damper 64, fluid passage 60, and the common pressure fluid in chambers 48 a, b, c define a passive hydropneumatic suspension system referred to as 100, wherein the static gas pressure in chamber 72 supports the sprung weight and the adiabatic expansion and contraction of the gas in chamber 72, in response to change in the volume of pressure fluid in chambers 48 a, b, c, produces a non-linear spring characteristic, and the fluid damper 64 absorbs fluid energy and converts it to heat energy as a function of the fluid flow rate through said damper. Gas spring action in chamber 72 and the action of damper 64 affect the common fluid pressure in chambers 48 a, b, c and thereby the force acting on vehicle hull 26 and reacted through roadwheels 22 a, b, c to ground as a function of the mean relative motion between the roadwheels and the hull.

Figure 4:
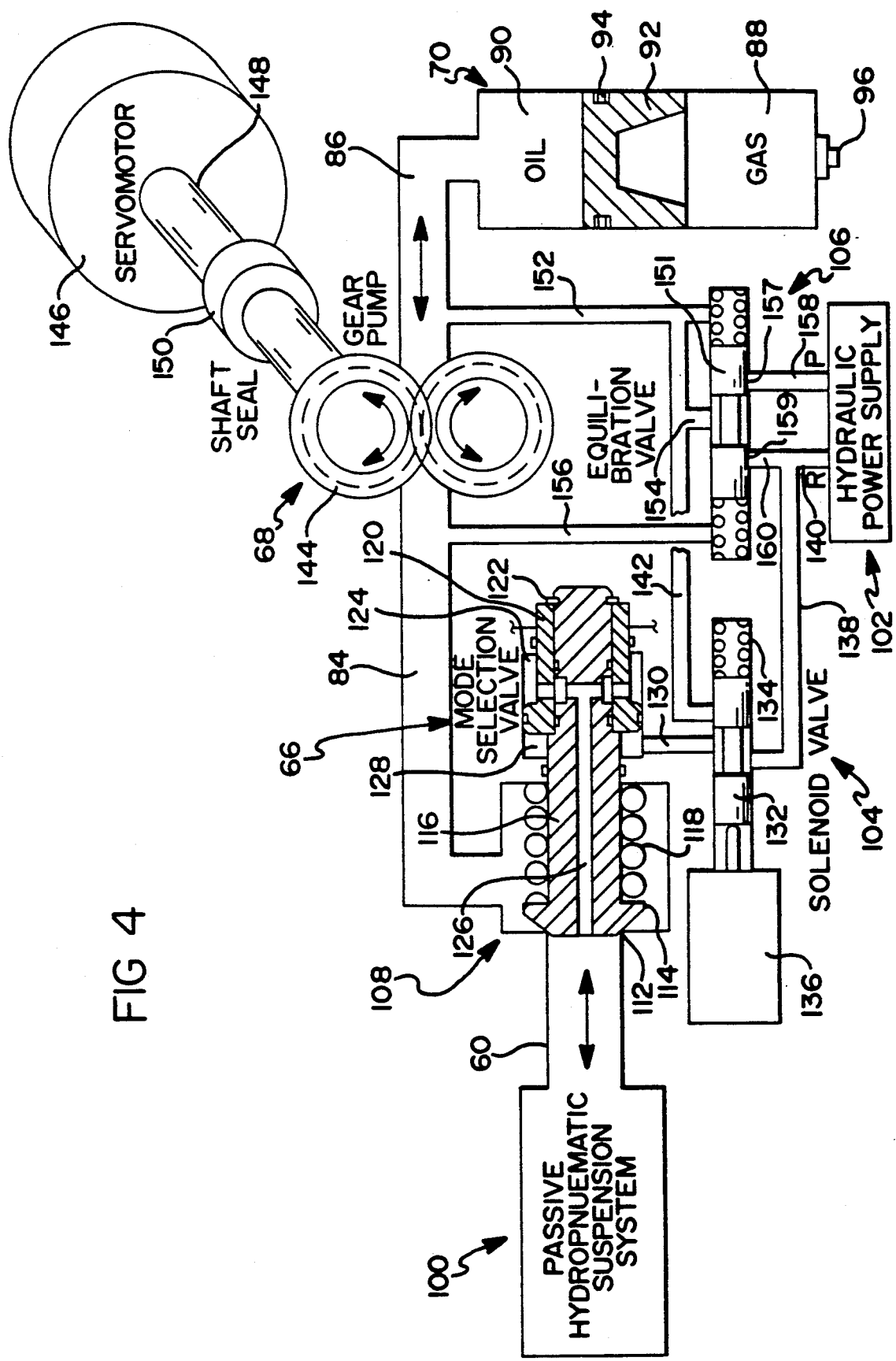
FIG. 4 is a partial schematic view of the hydraulic system shown in FIG. 3.

Mode selection valve 66, fluid passage 84, servopump 68, fluid passage 86, hydropneumatic accumulator 70 in combination with a hydraulic power supply 102, a solenoid operated valve 104 and an equilibration valve 106 define an electrohydraulic flow control system 108, best shown in FIG. 4. When mode selection valve 66 is energized connecting passive hydropneumatic suspension 100 to electrohydraulic control system 108, hydropneumatic accumulator 70 statically equilibrates servopump 68 and the servopump 68 dynamically transfers fluid energy between passive hydropneumatic suspension 100 and hydropneumatic accumulator 70 in a direction and at a rate proportional to the direction of rotation and velocity of servopump 68 to effect changes in the volume of pressure fluid in the passive hydropneumatic suspension system 100 and thereby the vertical force acting on the vehicle as will be explained below, in further detail.

An electrical control system referred to as 110, as shown in FIG. 3, controls the velocity of servopump 68 in reaction to sensed operating conditions to actively control the vertical force acting on the vehicle. Control system 110, flow control system 108, and suspension system 100, in combination, define AHSS 50.

As shown in FIG. 4, electrohydraulic flow control system 108 comprises hydraulically actuated mode selection valve 66 between fluid passage 60 and fluid passage 84, said valve comprises in combination, a valve seat 112 which can be retained in manifold 44, a poppet 114 which is guided and supported by a stem 116, a helical spring 118 concentric with said stem and biasing said poppet against said seat to prevent flow between fluid passage 60 and fluid passage 84, a double acting differential area piston 120 retained on stem 116 by a snap ring 122. A chamber 124 formed by one face of said piston and manifold 44 is connected by fluid passage 126 to fluid passage 60. The area of chamber 124 is greater than the area of valve seat 112 and the resultant force on stem 116 aids spring 118 to maintain said valve in a normally closed position at increased pressure in fluid passage 60. A chamber 128 formed by the opposite face of said piston and manifold 44 is connected by fluid passage 130 to the output port of a three way, spring biased, solenoid operated slide valve 132 in solenoid valve 104. Spring 134 at one end of valve 132 biases said valve towards solenoid 136 at the other end of said valve. In this position the output port is connected through the valve to a port which is connected through fluid passage 138 to the return line 140 of hydraulic power supply 102. The area of chamber 128 is larger than the area of chamber 124, and when solenoid 136 is energized to develop a force to overcome the bias of spring 134, valve 132 is moved to a position wherein the output port is connected through said valve to a port which is connected by fluid passages 142 and 152 to fluid passage 86 and thereby to hydropneumatic accumulator 70. The fluid pressure in accumulator 70 develops an opening force on piston 120 greater than the combined spring and pressure forces acting to close mode select valve 66, and valve 66 moves to a position for unrestricted flow between fluid passage 60 and fluid passage 84.

As shown in FIG. 4, an external gear pump 144 is located between fluid passage 84 and fluid passage 86. Gear pump 144 transfers fluid energy between hydropneumatic suspension system 100 and hydropneumatic accumulator 70. The small size, low weight, low cost, reduced inertia, and the insensitivity to contamination of an external gear pump are the rationale for its selection for the preferred embodiment of the present invention. Alternately other types of pumps may be selected for use in AHSS 50. A direct current servomotor 146 is coupled to pump 144 by drive shaft 148 through shaft seal 150. Pump 144 is driven by servomotor 146 to transfer fluid energy in a direction and at a rate proportional to the direction of rotation and speed of said motor. In combination pump 144, motor 146, and seal 150 form servopump 68.

The equilibration valve 106, in response to the pressure difference in fluid passage 84 and fluid passage 86, transfers fluid energy at a low rate between hydraulic power supply 102 and fluid passage 86 to reduce said pressure difference, and to equilibrate servopump 68 despite changed steady state operating and ambient conditions, for example, gross vehicle weight, location of its center of gravity, slope operation, seal leakage, and ambient and operating temperatures. A spring centered, three-way slide valve 151 has an output port connected through fluid passage 154 to fluid passage 142 and 154 through fluid passage 142 to fluid passage 152. Fluid passage 152 interconnects fluid passage 86 and a chamber on one end of said valve. Fluid passage 156 interconnects fluid passage 84 and a chamber on the other end of said valve. A first control port 157 is connected through fluid passage 158 to the pressure line of hydraulic power supply 102, and a second control port 159 is connected through fluid passage 160 to the return line of said power supply. When the pressure in fluid passage 84 is greater than the pressure in fluid passage 86, the valve 151 is displaced in a direction to interconnect the output port 154 and the first control port 157 to add fluid energy at a low flow rate from said power supply 102 to fluid passage 86 to increase the pressure therein to equilibrate servopump 68. When the pressure in fluid passage 86 is greater than the pressure in fluid passage 84, the valve 151 is displaced in a direction to interconnect the output port 154 and the second control port 159 to subtract fluid energy at a low flow rate from fluid passage 86 and vent it to the reservoir of the power supply 102 to decrease the pressure therein to equilibrate servopump 68.

Additionally, when the pressure in fluid passage 60 exceeds the pressure in fluid passage 86 and the pressure difference times the displacement per radian of the pump develops a torque which equals the stall torque of the servomotor, then the pressure in chamber 124 develops a force on piston 120 which is greater than the force developed by the pressure in chamber 128, and valve 66 momentarily closes to block the flow of fluid energy from the passive hydropneumatic suspension system 100 through servopump 68 to hydropneumatic accumulator 70, and thereby increases the vertical force acting on vehicle hull 26 to lift vehicle 10 to better clear large terrain disturbances.

The electrical system to control the velocity of servopump 68 as shown in FIG. 3 comprises an engine driven generator 180 to provide the average power requirement, a battery 182 to provide the peak power requirement, a servoamplifier 184 to provide current to drive the servomotor in response to voltage commands, an inner control loop 185, and a plurality of outer control loops 187, 189, 191. Both the inner control loop and the outer control loops provide voltage commands to amplifier 184 in response to sensed operating conditions.

The inner control loop 185 comprises a transducer 186 mounted on and driven by servomotor 146 to provide a voltage whose amplitude and polarity is proportional to the velocity of said motor. The voltage signal generated by tranducer 186 is fed back to amplifier 184 to control the velocity of motor 146.

A first outer control loop 187 comprises inertial transducers 188 a, b, c with an input excitation voltage and an output to provide voltage signals proportional to the mean vertical acceleration of the group of roadwheels 22a-22c on line 191a-191c. The voltages on lines 191a-191c have an amplitude and polarity which is proportional to the time rate of change of velocity of the device it is mounted on in inertial space. The voltages are summed and fed forward through an integrator 190 and a high pass filter 192 to amplifier 184 via summing junction 193 to command on a unity control basis the velocity of motor 146 to transfer fluid energy between passive suspension system 100 and accumulator 70 in a direction and at a rate equal and opposite to that direction and that rate of flow of fluid energy caused by the mean vertical velocity of the group of roadwheels 22a-22c to maintain the static vertical force acting between roadwheels 22a-22c and the corner of vehicle 10, supported thereon, and to thereby isolate the vehicle from that roadwheel motion caused by terrain disturbances at those frequencies above a predetermined cutoff frequency as established by high pass filter 192.

A second outer position control loop 189 comprises, means defining a group of position transducers 194 a, b, c each having a housing fixedly secured to roadarm spindles 30 a, b, c and a shaft connected for rotation to roadarms 28 a, b, c to provide a voltage proportional to the mean vertical displacement of roadwheels 22 a, b, c relative to vehicle hull 26. The position transducer's input is an excitation voltage and its output is a voltage whose amplitude and polarity is proportional to the displacement of the transducer relative to an initial reference position of the roadwheel to the vehicle. The sum of voltages on lines 195a-c are fed to differentiator 197 and the first derivative signal of the voltage sum and the voltage sum are fed back through a low pass filter 196 to amplifier 184 via summing junction 193. Thus, the displacement voltage signal commands the velocity of servomotor 146 and the first derivative thereof commands the rate of change of velocity to provide kinetic damping to enable the gain to be increased and the performance improved in the position control loop 189. The servopump 68 transfers fluid energy between passive suspension system 100 and accumulator 70 in a direction and at a rate to control the vertical force acting between roadwheels 22a–22c and hull 26 to maintain a selected displacement of roadwheels 22a–22c relative to hull 26 and thereby equilibrating the vehicle relative to the terrain at those frequencies below a predetermined cut-off frequency established by low pass filter 196. A height control 198 is provided in the drivers compartment to permit the driver to add a voltage to, or subtract a voltage from, the mean voltage output of said position transducers to select a desired displacement between roadwheels 22a–22c and hull 26 and to thereby control the nominal height of a corner of the vehicle relative to the terrain.

Third outer hull acceleration control loop 191 comprises means defining an inertial transducer 200 fixedly secured to vehicle hull 26 to provide a voltage proportional to the vertical acceleration of said hull relative to an inertial reference. Specifically, the input to transducer 200 is an excitation voltage and its output is a voltage whose amplitude and polarity is proportional to the time rate of change of velocity of the vehicle in space. Differentiator 199 produces first derivative of the vertical acceleration signal on line 201. The sum of vertical acceleration voltage on line 203 and the first derivative of voltage on line 201 is fed back through a band pass filter 202 to amplifier 184 via summing junction 193, wherein such hull vertical acceleration voltage commands the velocity of servomotor 14 and its first derivative signal commands the rate of change of velocity of servomotor 146 to provide kinetic damping to enable the gain to be increased and the performance improved in the hull acceleration control loop 191. The servopump 68 transfers fluid energy between passive suspension system 100 and accumulator 70 in a direction and at a rate to control the vertical force acting between said roadwheels and said hull to oppose inertial forces which disturb the hull and thereby stabilizes the vehicle relative to a hull inertial reference in a band of frequencies including the pitch, roll, and heave frequencies of the vehicle's hull.

Additionally, a vehicle velocity transducer 206 provides a voltage proportional to the longitudinal velocity of said vehicle to control the micro processor based digital filters characteristics of low pass filter 196 and high pass filter 192, to vary their cut-off frequencies in direct proportion to vehicle velocity, and to thereby maintain the equilibration and isolation of the vehicle relative to the terrain independent of the velocity of the vehicle, e.g., at higher vehicle speeds the cut-off frequency of the high pass filter is raised and the cut-off frequency of the low pass filter is raised to assure that the servopump 68 will continue to produce transfers of volumes of pressure fluid between the passive hydropneumatic suspension system 100 and the series connected hydropneumatic accumulator to maintain the desired active suspension characteristics of vehicle 10.

AHSS 50, as described, controls the vertical force acting on a corner of vehicle 10 and thereby the isolation, the equilibration, and the stabilization of that corner of said vehicle. The four corners of vehicle 10 are each equipped with a similar AHSS 50 which in combination maintain the height and the attitude of vehicle 10 relative to the terrain at frequencies below the cut-off frequencies of the low and high pass filters 196, 192 and relative to the inertial references established by vertical accelerometer 200 at higher frequencies.

Figure 5:
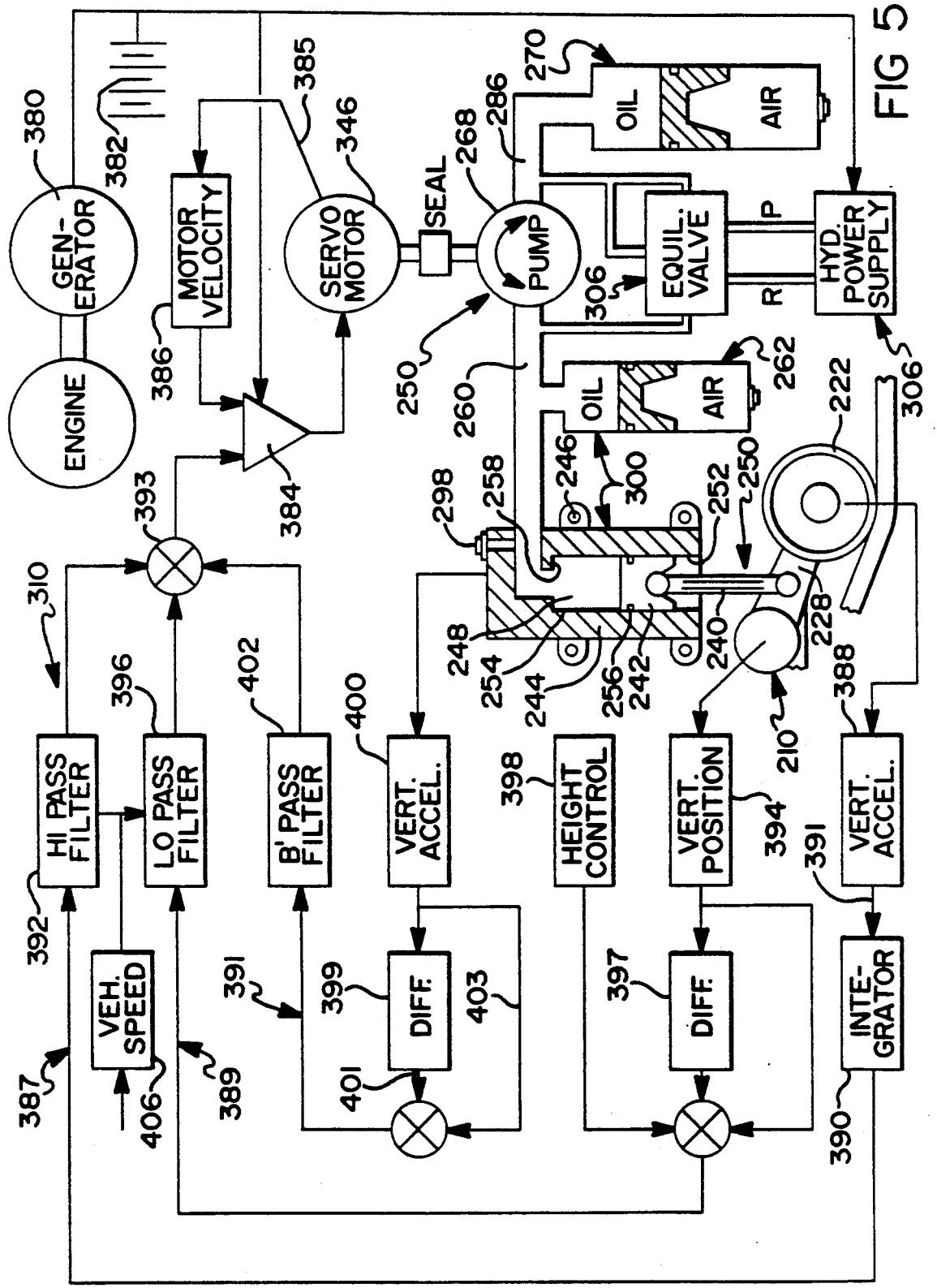
FIG. 5 is a schematic view of another embodiment of the present invention supporting the vehicle relative to an individual roadwheel.

In the embodiment of FIG. 5, vehicle 210 is supported relative to a plurality of roadwheels 222 each roadwheel has an individual active suspension system 250.

As shown in FIG. 5, one end of a connecting rod 240 is connected for oscillation and misalignment to roadarm 228 the other end of connecting rod 240 is connected for limited oscillation and misalignment to a piston 242. Piston 242 is supported for vertical motion in manifold 244. Manifold 244 is fixedly secured to vehicle hull 226 by mounting bolts 246. Piston 242 and manifold 244 form a pressure fluid chamber 248. Fluid conduits in manifold 244 interconnect fluid chamber 248 with the other hydraulic, and hydropneumatic components of active hydropneumatic suspension system 250 hereinafter AHSS 250.

Manifold 244 of AHSS 250 contains a cylinder bore 252. Piston 242 is supported by the wall 254 of cylinder bore 252 for vertical motion. The piston 242 and pressure fluid chamber 248 define a hydraulic actuator. A piston seal 256 retained in piston 242 and a cylinder head 258 which is an integral portion of manifold 244 form a chamber 248 which encloses a volume of pressure fluid. Fluid passage 260 connects chamber 248 to a series arrangement of a first hydropneumatic accumulator 262, a servopump 268, and a second hydropneumatic accumulator 270.

Hydropneumatic accumulators 262 and 270 are similar in construction to previously described accumulators 62 and 72. Servopump 268 is similar in construction to servopump 68.

A charge fitting 298 in manifold 244 directs pressure fluid into fluid conduit 260 to compress the gas in accumulators 262 and 270 to support the vehicle at the desired height. The static gas pressure in accumulator 262 supports the sprung weight and the adiabatic expansion and contraction of the gas in said accumulator provides a non-linear spring characteristic effecting the fluid pressure in chamber 248 and thereby the force acting on the vehicle and reacted through roadwheel 222 to ground as a function of the relative motion between said roadwheel and said vehicle.

Control system 310 (FIG. 5) which controls the velocity of servopump 268 is similar in design and operation to control system 110 previously described and its like components are identified with like 300 or 400 series reference numerals, it being understood that like components are similar and have similar functions as those described with reference to control system 110.

AHSS 250 as described, controls the vertical force acting in vehicle 210 to improve the equilibration of the vehicle at low frequencies and to improve at higher frequencies the isolation of the vehicle 210 relative to terrain disturbances and the stabilization of the vehicle relative to inertial forces applied to the vehicle. Said suspension system acting in conjunction with similar systems at each of a plurality of raodwheels in combination maintain the height and the attitude of the vehicle relative to the terrain at low frequencies and relative to inertial references at higher frequencies.

Hydropneumatic accumulator 270 statically equilibrates servopump 268 and servopump 268 dynamically transfers fluid energy between passive hydropneumatic suspension system 300 formed by accumulator 262 and the chamber 248 and accumulator 270 in a direction and at a rate proportional to the velocity of said servopump to effect the volume of pressure fluid in the passive suspension system and thereby the motion of the vehicle relative to the roadwheel at low frequencies and the vertical force acting on the vehicle at higher frequencies.

Figure 6:
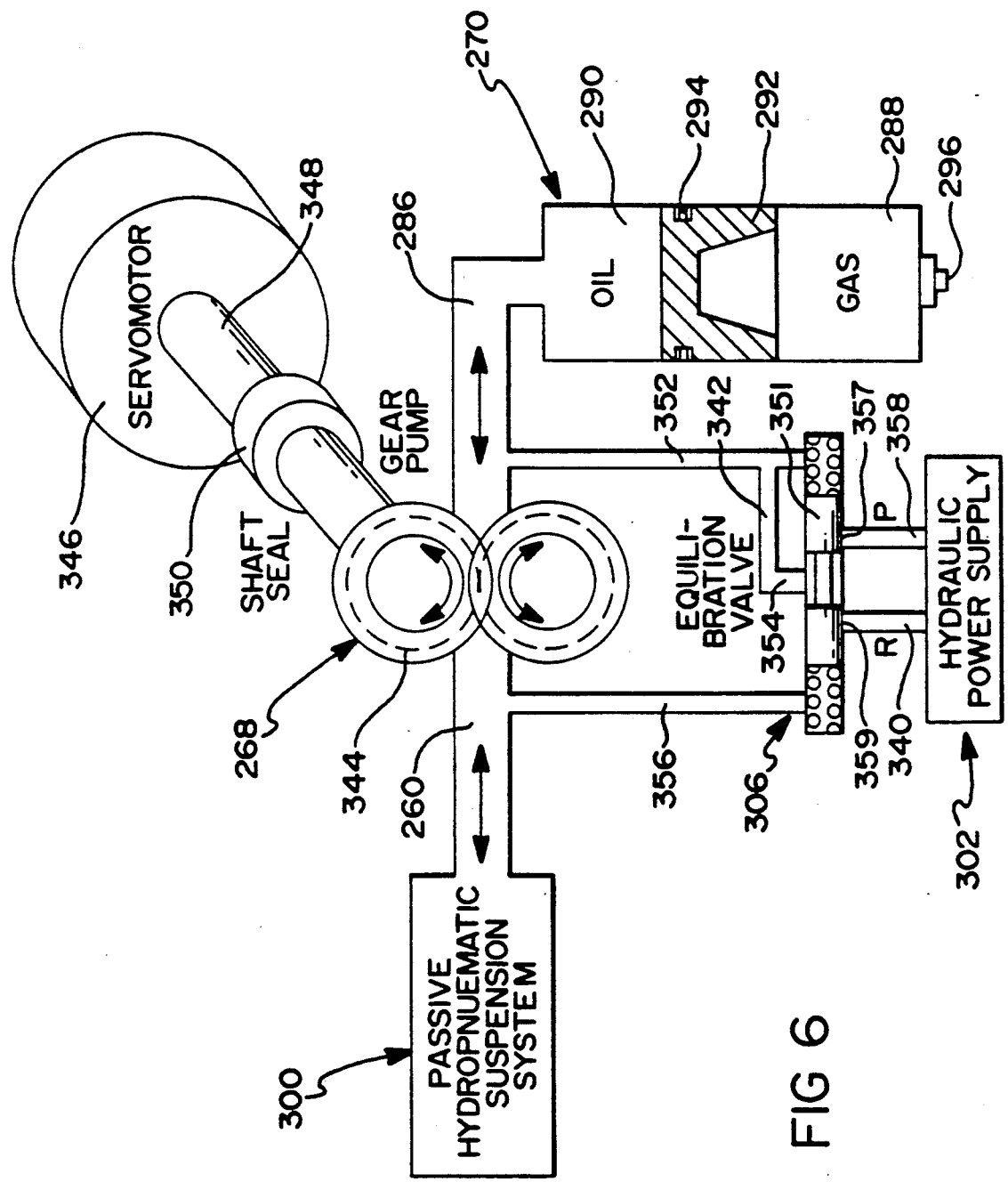
FIG. 6 is a partial schematic view of the hydraulic system shown in FIG. 5.

As shown in FIG. 6, an equilibration value 306 in response to the pressure difference in fluid conduit 260 and fluid conduit 286 transfer fluid energy at a low rate between hydraulic power supply 302 and fluid conduit 286 to reduce pressure difference, and to equilibrate servopump 268 despite changed steady state operating and ambient conditions the design. Operation of value 306 is similar to that of value 106 previously described.

What is claimed is:

1. An active hydropneumatic suspension system for a sprung mass of a vehicle supported on the unsprung mass of a roadwheel, the active hydropneumatic suspension system statically supporting the sprung mass of a vehicle with a predetermined force and at a predetermined position relative to the unsprung mass of the roadwheel while dynamically controlling force between the sprung mass of the vehicle and the roadwheel so as to control the position of the sprung mass of the vehicle when subject to the motion of the roadwheel, to inertial force acting on the sprung mass of the vehicle as the vehicle is driven, and to external force acting on the sprung mass of the vehicle as the vehicle is either driven or is stationary, comprising:

- a passive suspension system means for resiliently supporting said sprung mass of the vehicle at the predetermined static position including a hydraulic actuator having a first volume of pressure fluid at a predetermined static pressure; said hydraulic actuator having a first end and a second end; said first end connected to said sprung mass of the vehicle and said second end connected to said roadwheel;
- servopump means for transferring fluid;
- a hydropneumatic accumulator separate from said passive suspension system; said hydropneumatic accumulator containing a volume of pressure gas having a static pressure equal to the static pressure of the pressure fluid in said hydraulic actuator and said hydropneumatic accumulator further having a second volume of pressure fluid;
- first and second fluid conduit means for connecting said passive suspension system means, said servopump means and said hydropneumatic accumulator in series fluid flow relation;
- pressure conditioning means including said hydropneumatic accumulator for resiliently equilibrating said servopump means and said servopump means including means for transferring pressure fluid between said first volume of pressure fluid in said hydraulic actuator of said passive suspension system means and said second volume of pressure fluid in said hydropneumatic accumulator;
- power supply means for providing an energy requirement to control and to drive said servopump means for transferring pressure fluid between said hydraulic actuator and said hydropneumatic accumulator which energy requirement is proportional to the differential pressure across said servopump means between said first and second fluid conduit means whereby pressure in either said hydraulic actuator or said hydropneumatic accumulator serves to balance pressure across said servopump means for reducing the energy required to operate said servopump means during transfer of pressure fluid by said servopump means between said first volume of pressure fluid in said hydraulic actuator of said passive suspension system and said second volume of pressure fluid in said hydropneumatic accumulator;
- detector means for sensing one or more motions including the absolute motion of said sprung mass of the vehicle, the absolute motion of said roadwheel and the relative motion of said sprung mass of the vehicle to said roadwheel; and
- control system means operative in response to said sensed motions for conditioning said servopump means to vary flow of pressure fluid by said servopump means between said first and second fluid conduit means to control the transfer of pressure fluid between said first volume of pressure fluid in said hydraulic actuator of said passive suspension means and said second volume of pressure fluid in said hydropneumatic accumulator to dynamically control the force acting between said sprung mass of said vehicle and said roadwheel for controlling the relative position of said sprung mass of said vehicle to said roadwheel at low frequencies of relative motion between said sprung mass of said vehicle and said roadwheel to thereby improve equilibration of said sprung mass of the vehicle so as to improve vehicle handling and for controlling the absolute position of said sprung mass of the vehicle at higher frequencies of motion of either or both of said sprung mass of said vehicle and said roadwheel to thereby improve stabilization and isolation of said sprung mass of the vehicle so as to improve the ride quality of vehicle while minimizing the energy requirements during operation of said servopump means to be proportional to the pressure differential across said servopump means rather than proportional to a higher absolute pressure in said hydraulic actuator.

2. In the active hydropneumatic suspension system of claim 1, said hydraulic actuator being a single acting actuator.

3. An active hydropneumatic suspension system for a sprung mass of a vehicle supported on the unsprung mass of a roadwheel, the active hydropneumatic suspension system statically supporting the sprung mass of a vehicle with a predetermined force and at a predetermined position relative to the unsprung mass of the roadwheel while dynamically controlling force between the sprung mass of the vehicle and the roadwheel so as to control the position of the sprung mass of the vehicle when subject to the motion of the roadwheel, to inertial force acting on the sprung mass of the vehicle as the vehicle is driven, and to external force acting on the sprung mass of the vehicle as the vehicle is either driven or is stationary, comprising:

- a passive suspension system means for resiliently supporting said sprung mass of the vehicle at the predetermined static position including a hydraulic actuator having a first volume of pressure fluid at a predetermined static pressure; said hydraulic actuator having a first end and a second end; said first end connected to said sprung mass of the vehicle and said second end connected to said roadwheel;
- servopump means for transferring fluid including a fixed displacement pump and a direct current servomotor;
- a hydropneumatic accumulator separate from said passive suspension system; said hydropneumatic accumulator containing a volume of pressure gas having a static pressure equal to the static pressure of the pressure fluid in said hydraulic actuator and said hydropneumatic accumulator further having a second volume of pressure fluid;

first and second fluid conduit means for connecting said passive suspension system means, said servopump means and said hydropneumatic accumulator in series fluid flow relation;

pressure conditioning means including said hydropneumatic accumulator for resiliently equilibrating said servopump means and said servopump means including means for transferring pressure fluid between said first volume of pressure fluid in said hydraulic actuator of said passive suspension system means and said second volume of pressure fluid in said hydropneumatic accumulator;

power supply means for providing an energy requirement to control and to drive said servopump means for transferring pressure fluid between said hydraulic actuator and said hydropneumatic accumulator which energy requirement is proportional to the differential pressure across said servopump means between said first and second fluid conduit means whereby pressure in either said hydraulic actuator or said hydropneumatic accumulator serves to balance pressure across said servopump means for reducing the energy required to operate said direct current servomotor during transfer of pressure fluid by said fixed displacement pump between said first volume of pressure fluid in said hydraulic actuator of said passive suspension system and said second volume of pressure fluid in said hydropneumatic accumulator;

detector means for sensing one or more motions including the absolute motion of said sprung mass of the vehicle, the absolute motion of said roadwheel and the relative motion of said sprung mass of the vehicle to said roadwheel; and control system means operative in response to said sensed motions for conditioning servopump means to vary flow of pressure fluid by said servopump means between said first and second fluid conduit means to control the transfer of pressure fluid between said first volume of pressure fluid in said hydraulic actuator of said passive suspension means and said second volume of pressure fluid in said hydropneumatic accumulator to dynamically control the force acting between said sprung mass of said vehicle and said roadwheel for controlling the relative position of said sprung mass of said vehicle to said roadwheel at low frequencies of relative motion between said sprung mass of said vehicle and said roadwheel to thereby improve equilibration of said sprung mass of the vehicle so as to improve vehicle handling and for controlling the absolute position of said sprung mass of the vehicle at higher frequencies of motion of either or both of said sprung mass of said vehicle and said roadwheel to thereby improve stabilization and isolation of said sprung mass of the vehicle so as to improve the ride quality of vehicle while minimizing the energy requirements during operation of said servopump means to be proportional to the pressure differential across said servopump means rather than proportional to a higher absolute pressure in said hydraulic actuator.

4. In the active hydropneumatic suspension system of claim 3, a fluid shaft seal, said servopump means including a mechanical coupling between said servomotor and said pump, said mechanical coupling direct through and sealed by said fluid shaft seal.

5. In the active hydropneumatic suspension system of claim 3, said fixed displacement pump being an external gear pump.

6. An active hydropneumatic suspension system for a sprung mass of a vehicle supported on the unsprung mass of a roadwheel, the active hydropneumatic suspension system statically supporting the sprung mass of a vehicle with a predetermined force and at a predetermined position relative to the unsprung mass of the roadwheel while dynamically controlling force between the sprung mass of the vehicle and the roadwheel so as to control the position of the sprung mass of the vehicle when subject to the motion of the roadwheel, to inertial force acting on the sprung mass of the vehicle as the vehicle is driven, and to external force acting on the sprung mass of the vehicle as the vehicle is either driven or is stationary, comprising:

a passive suspension system means for resiliently supporting said sprung mass of the vehicle at the predetermined static position including a hydraulic actuator having a first volume of pressure fluid at a predetermined static pressure; said hydraulic actuator having a first end and a second end; said first end connected to said sprung mass of the vehicle and said second end connected to said roadwheel;

servopump means for transferring fluid;

a hydropneumatic accumulator separate from said passive suspension systems; said hydropneumatic accumulator containing a volume of pressure gas having a static pressure equal to the static pressure of the pressure fluid in said hydraulic actuator and said hydropneumatic accumulator further having a second volume of pressure fluid;

first and second fluid conduit means for connecting said passive suspension system means, said servopump means and said hydropneumatic accumulator in series fluid flow relation;

pressure conditioning means including said hydropneumatic accumulator for resiliently equilibrating said servopump means and said servopump means including means for transferring pressure fluid between said first volume of pressure fluid in said hydraulic actuator of said passive suspension system means and said second volume of pressure fluid in said hydropneumatic accumulator;

power supply means for providing an energy requirement to control and to drive said servopump means for transferring pressure fluid between said hydraulic actuator and said hydropneumatic accumulator which energy requirement is proportional to the differential pressure across said servopump means between said first and second fluid conduit means whereby pressure in either said hydraulic actuator or said hydropneumatic accumulator serves to balance pressure across said servopump means for reducing the energy required to operate said servopump means during transfer of pressure fluid by said servopump means between said first volume of pressure fluid in said hydraulic actuator of said passive suspension system and said second volume of pressure fluid in said hydropneumatic accumulator;

detector means for sensing one or more motions including the absolute motion os said sprung mass of the vehicle, the absolute motion of said roadwheel and the relative motion of said sprung mass of the vehicle to said roadwheel; and control system means operative in response to said sensed motions for conditioning servopump means to vary flow of pressure fluid by said servopump means between said first and second fluid conduit means to control the transfer of pressure fluid between said first volume of pressure fluid in said hydraulic actuator of said passive suspension means and said second volume of pressure fluid in said hydropneumatic accumulator to dynamically control the force acting between said sprung mass of said vehicle and said roadwheel for controlling the relative position of said sprung mass of said vehicle to said roadwheel at low frequencies of relative motion between said sprung mass of said vehicle and said roadwheel to thereby improve equilibration of said sprung mass of the vehicle so as to improve vehicle handling and for controlling the absolute position of said sprung mass of the vehicle at higher frequencies of motion of either or both of said sprung mass of said vehicle and said roadwheel to thereby improve stabilization and isolation of said sprung mass of the vehicle so as to improve the ride quality of vehicle while minimizing the energy requirements during operation of said servopump means to be proportional to the pressure differential across said servopump means rather than proportional to a higher absolute pressure in said hydraulic actuator;

said pressure conditioning means including equilibration means for directing the pressure of said hydropneumatic accumulator to balance pressure across said servopump means, said equilibration including equilibration control systems means to compensate at a low rate for changes in steady state operating conditions and ambient conditions.

7. In the active hydropneumatic suspension system of claim 6, said equilibration control system means including a hydraulic power supply and an equilibration control valve, said equilibration control valve in response to pressure difference between said first and said second fluid conduit means transferring fluid energy at a low rate between said hydraulic power supply and said hydropneumatic accumulator to reduce said pressure difference, and to thereby equilibrate said servopump means.

8. An active hydropneumatic suspension system for a sprung mass of a vehicle supported on the unsprung mass of a roadwheel, the active hydropneumatic suspension system statically supporting the sprung mass of a vehicle with a predetermined force and at a predetermined position relative to the unsprung mass of the roadwheel while dynamically controlling force between the sprung mass of the vehicle and the roadwheel so as to control the position of the sprung mass of the vehicle when subject to the motion of the roadwheel, to inertial force acting on the sprung mass of the vehicle as the vehicle is driven, and to external force acting on the sprung mass of the vehicle as the vehicle is either driven or is stationary, comprising:

a passive suspension system means for resiliently supporting said sprung mass of the vehicle at the predetermined static position including a hydraulic actuator having a first volume of pressure fluid at a predetermined static pressure; said hydraulic actuator having a first end a and a second end; said first end connected to said sprung mass of the vehicle and said second end connected to said roadwheel;

servopump means for transferring fluid;

a hydropneumatic accumulator separate from said passive suspension system; said hydropneumatic accumulator containing a volume of pressure gas having a static pressure equal to the static pressure of the pressure fluid in said hydraulic actuator and said hydropneumatic accumulator further having a second volume of pressure fluid;

first and second fluid conduit means for connecting said passive suspension system means, said servopump means and said hydropneumatic accumulator in series fluid flow relation;

pressure conditioning means including said hydropneumatic accumulator for resiliently equilibrating said servopump means and said servopump means including means for transferring pressure fluid between said first volume of pressure fluid in said hydraulic actuator of said passive suspension system means and said second volume of pressure fluid in said hydropneumatic accumulator;

power supply means for providing an energy requirement to control and to drive said servopump means for transferring pressure fluid between said hydraulic actuator and said hydropneumatic accumulator which energy requirement is proportional to the differential pressure across said servopump means between said first and second fluid conduit means whereby pressure in either said hydraulic actuator or said hydropneumatic accumulator serves to balance pressure across said servopump means for reducing the energy required to operate said servopump means during transfer of pressure fluid by said servopump means between said first volume of pressure fluid in said hydraulic actuator of said passive suspension system and said second volume of pressure fluid in said hydropneumatic accumulator;

detector means for sensing one or more motions including the absolute motion os said sprung mass of the vehicle, the absolute motion of said roadwheel and the relative motion of said sprung mass of the vehicle to said roadwheel; and control system means operative in response to said sensed motions for conditioning servopump means to vary flow of pressure fluid by said servopump means between said first and second fluid conduit means to control the transfer of pressure fluid between said first volume of pressure fluid in said passive hydraulic actuator of said suspension means and said second volume of pressure fluid in said hydropneumatic accumulator to dynamically control the force acting between said sprung mass of said vehicle and said roadwheel for controlling the relative position of said sprung mass of said vehicle to said roadwheel at low frequencies of relative motion between said sprung mass of said vehicle and said roadwheel to thereby improve equilibration of said sprung mass of the vehicle so as to improve vehicle handling and for controlling the absolute position of said sprung mass of the vehicle at higher frequencies of motion of either or both of said sprung mass of said vehicle and said roadwheel to thereby improve stabilization and isolation of said sprung mass of the vehicle so as to improve the ride quality of vehicle while minimizing the energy requirements during operation of said servopump means to be proportional to the pressure differential across said servopump means rather than proportional to a higher absolute pressure in said hydraulic actuator;

said servopump means including a fixed displacement pump, direct current servomotor, and an electrical power supply; said control system means further including a servoamplifier, an inner control loop to control the velocity of said servomotor; and a plurality of outer control loops, each including an electronic filter to command the velocity of said servomotor in response to sensed operation conditions to control the force acting between said sprung mass of the vehicle and said roadwheel.

9. In the active suspension system of claim 8, said electronic filter including means defining a high pass filter having a cut-off frequency, said roadwheel having a roadwheel spindle and roadwheel motions caused by terrain disturbances above the cut-off frequency of said high pass filter, one of said plurality of outer control loops including a vertical accelerometer fixedly secured t said roadwheel spindle;

an integrator;

said high-pass filter, vertical accelerometer and said integrator combining to command on a unity control basis the velocity of said servomotor and thereby said fixed displacement pump so as to transfer fluid energy between said passive suspension system means and said hydropneumatic accumulator to isolate said sprung mass of the vehicle from those roadwheel motions caused by terrain disturbances at frequencies above the cut-off frequency of said high-pass filter.

10. In the active hydropneumatic suspension system of claim 8, one of said plurality of outer control loops having a position transducer to sense the relative motion between said roadwheel and said sprung mass of the vehicle;

a low-pass filter having a cut-off frequency to command the velocity of said servomotor and thereby the velocity of said fixed displacement pump so as to transfer fluid energy between said passive suspension system means and said hydropneumatic accumulator to maintain a selected displacement of said roadwheel relative to said sprung mass of the vehicle, and to thereby equilibrate said sprung mass of the vehicle at those frequencies below the cut-off frequency of the low-pass filter.

11. In the active hydropneumatic suspension system of claim 10, said sprung mass of the vehicle having a nominal height, driver operated means for providing an electrical command to control the nominal height of said sprung mass of the vehicle relative to the terrain.

12. In the active hydropneumatic suspension system of claim 10, means for generating the first derivative signal of the output of said position transducer and means response to said first derivative signal for increasing gain in one of said plurality of outer control loops for improved performance.

13. In the active hydropneumatic suspension system of claim 8, said sprung mass of the vehicle being a vehicle hull having pitch, roll and heave frequencies, said higher frequencies including a band encompassing the pitch, roll and heave frequencies of said vehicle hull, one of said plurality of outer control loops including a vertical accelerometer fixedly secured to said vehicle hull;

a band pass filter to command velocity of said servomotor and thereby said fixed displacement pump so as to transfer fluid energy between said passive suspension system means and said hydropneumatic accumulator to oppose inertial and external forces which disturb said vehicle hull and to thereby stabilize the vehicle relative to said inertial reference in a band of frequencies including the pitch, roll, and heave frequencies of said vehicle hull.

14. In the active hydropneumatic suspension system of claim 13, means for generating the first derivative of the output of said vertical accelerometer and means responsive to said first derivative signal for increasing gain in one of said plurality of outer control loops for improved performance.

15. In the active hydropneumatic suspension system of claim 8, a high-pass filter and a low-pass filter, means for varying the cut-off frequencies of said high-pass filter and said low-pas filter proportional to the velocity of said vehicle to thereby maintain isolation and equilibration of the vehicle relative to the terrain independent of velocity of the vehicle.

16. In the active hydropneumatic suspension system of claim 8, said electrical power supply including an engine driven generator to provide an average power requirement to operate said servopump means and a group of batteries to store electrical energy to provide a peak power requirement of said servopump means.

17. In the active hydropneumatic suspension system of claim 8, said electronic filters being microprocessor based digital filters.

18. An active hydropneumatic suspension system for a sprung mass of a vehicle supported on the unsprung mass of a roadwheel, the active hydropneumatic suspension system statically supporting the sprung mass of a vehicle with a predetermined force and at a predetermined position relative to the unsprung mass of the roadwheel while dynamically controlling force between the sprung mass of the vehicle and the roadwheel so as to control the position of the sprung mass of the vehicle when subject to the motion of the roadwheel, to inertial force acting on the sprung mass of the vehicle as the vehicle is driven, and to external force acting on the sprung mass of the vehicle as the vehicle is either driven or is stationary, comprising:

a passive suspension system means for resiliently supporting said sprung mass of the vehicle at the predetermined static position including a hydraulic actuator having a first volume of pressure fluid at a predetermined static pressure; said hydraulic actuator having a first end and a second end; said first end connected to said sprung mass of the vehicle and said second end connected to said roadwheel;

servopump means for transferring fluid;

a hydropneumatic accumulator separate from said passive suspension system; said hydropneumatic accumulator containing a volume of pressure gas having a static pressure equal to the static pressure of the pressure fluid in said hydraulic actuator and said hydropneumatic accumulator further having a second volume of pressure fluid;

first and second fluid conduit means for connecting said passive suspension system means, said servopump means and said hydropneumatic accumulator in series fluid flow relation;

pressure conditioning means including said hydropneumatic accumulator for resiliently equilibrating said servopump means and said servopump means including means for transferring pressure fluid between said first volume of pressure fluid in said hydraulic actuator of said passive suspension system means and said second volume of pressure fluid in said hydropneumatic accumulator;

power supply means for providing an energy requirement to control and to drive said servopump means for transferring pressure fluid between said hydraulic actuator and said hydropneumatic accumulator which energy requirement is proportional to the differential pressure across said servopump means between said first and second fluid conduit means whereby pressure in either said hydraulic actuator or said hydropneumatic accumulator serves to balance pressure across said servopump means for reducing the energy required to operate said servopump means during transfer of pressure fluid by said servopump means between said first volume of pressure fluid in said hydraulic actuator of said passive suspension system and said second volume of pressure fluid in said hydropneumatic accumulator;

detector means for sensing one or more motions including the absolute motion os said sprung mass of the vehicle, the absolute motion of said roadwheel and the relative motion of said sprung mass of the vehicle to said roadwheel; and control system means operative in response to said sensed motions for conditioning servopump means to vary flow of pressure fluid by said servopump means between said first and second fluid conduit means to control the transfer of pressure fluid between said first volume of pressure fluid in said hydraulic actuator of said passive suspension means and said second volume of pressure fluid in said hydropneumatic accumulator to dynamically control the force acting between said sprung mass of said vehicle and said roadwheel for controlling the relative position of said sprung mass of said vehicle to said roadwheel at low frequencies of relative motion between said sprung mass of said vehicle and said roadwheel to thereby improve equilibration of said sprung mass of the vehicle so as to improve vehicle handling and for controlling the absolute position of said sprung mass of the vehicle at higher frequencies of motion of either or both of said sprung mass of said vehicle and said roadwheel to thereby improve stabilization and isolation of said sprung mass of the vehicle so as to improve the ride quality of vehicle while minimizing the energy requirements during operation of said servopump means to be proportional to the pressure differential across said servopump means rather than proportional to a higher absolute pressure in said hydraulic actuator;

integral manifold means forming said first and second fluid conduit means and containing in series flow relation said passive suspension means, said servopump means and said hydropneumatic accumulator, and said servopump means including a gear pump with a housing.

19. In the active hydropneumatic suspension system of claim 18, said manifold fixedly secured to the vehicle.

* * * * *